Feb. 23, 1932.  A. H. LEIPERT  1,846,603
CHASSIS CONSTRUCTION
Filed Jan. 22, 1931

Inventor:
August H. Leipert
By his Attorneys
Redding, Greeley, O'Shea & Campbell Patented Feb. 23, 1932

1,846,603

UNITED STATES PATENT OFFICE

AUGUST H. LEIPERT, OF COLLEGE POINT, NEW YORK, N. Y., ASSIGNOR TO INTERNATIONAL MOTOR COMPANY, OF NEW YORK, N. Y., A CORPORATION OF DELAWARE

CHASSIS CONSTRUCTION

Application filed January 22, 1931. Serial No. 510,418.

This invention relates to certain improvements in the construction of a chassis and particularly the chassis for commercial vehicles. The principal object of the present invention is to provide what may be termed a low hung chassis frame, that is, a frame which shall have minimum ground clearance. The problem presented in accomplishing this has to do primarily with preserving the strength in a given frame taking into account the stresses to which the side frame members are subjected. For instance, it is well recognized in this art that maximum strains are impressed on the right-hand side frame member of the chassis because that is the frame member which is on the low side usually when the vehicle is traveling and when it is parked alongside a road or street. Under such conditions it is important to preserve greater strength relatively in the right-hand side frame member than in the left-hand side frame member. Another factor affecting the problem of obtaining a low hung chassis is concerned with the relation of the supporting axle thereto and provision for its ready removal if repairs are needed, since the most advantageous way to obtain a low hung chassis is to pass the axle member through openings in the side frame members. The present invention has to do with a practical construction involving this relationship which, nevertheless, preserves the maximum strength of the side frame members while permitting the axle to be removed through one side frame member. This highly desirable assembly is accomplished by forming openings in the side frame members through which the axle may extend and have ample freedom for motion vertically and providing, in addition, an opening in the left-hand side frame member of such character as not to seriously impair its strength while permitting the withdrawal of the axle therethrough.

A further object of the invention is to provide a spring suspension for a low hung chassis of the character described which shall be so connected to the chassis as not to cut down the ground clearance behind the wheels to such an extent as to interfere with normal maneuvers of the vehicle as when backing up against a string piece or low platform or curb. This condition is obtained in accordance with the invention by securing the rear ends of the springs to the frame by compression shackles which do not extend below the level of the side frame members.

The construction will be described in greater detail in connection with the embodiment illustrated in the accompanying drawings, wherein.

The right-hand side frame member of the chassis is indicated at $a$, the left-hand side frame member at $b$ and one of the connecting members at $c$. The right and left hand frame members are provided with vertical openings $a'$, $b'$, respectively, through which pass the axle $d$. It is to be noted that these openings $a'$, $b'$, extend a greater distance below the axle when in normal position than above it as is desirable since the greater range of movement of the axle with relation to the frame from its normal position is relatively downward rather than upward. The axle is afforded freedom of motion in a vertical direction by the openings $a'$, $b'$. On the axle are mounted supporting wheels $e$. To provide for the openings described the frame members $a$, $b$, are enlarged in depth adjacent to them to a sufficient degree to leave at least as much supporting metal in that area as at any other point and the peculiar shape given to the frame in such area adds strength since it is arch shaped above and below said openings. Axles such as $d$ adapted to receive the final drive gearing are enlarged at their center portions as indicated at $d'$, the resulting shape being somewhat that of a banjo. In assembling this axle in accordance with the invention it is necessary that the banjo section shall pass through one of the side frame members. To permit this the left-hand side frame member $b$, which is subject to less stress normally than the right-hand side frame member $a$, has an opening $b^2$ formed therein which extends substantially horizontally of the frame and is of such size and configuration as to permit the banjo section $d'$ of the axle to pass therethrough. The presence of such an opening reduces the strength of the side frame member $b$ to the least possible extent and yet permits the axle to be moved in or out freely. It will be noticed that it is unnecessary to provide the side frame member $a$ with corresponding openings so relatively greater strength is maintained in it.

Figure 1:
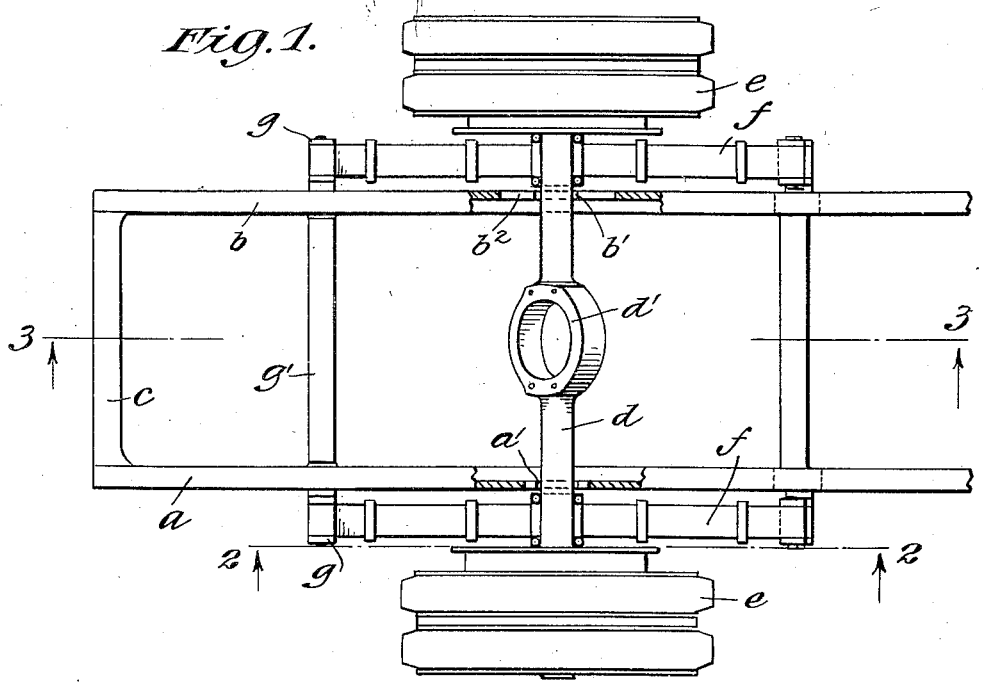
Figure 1 is a fragmentary view in plan of a chassis embodying the improvements, parts being broken away to show the relation of the axle to the openings in the side frame members.
Figure 2:
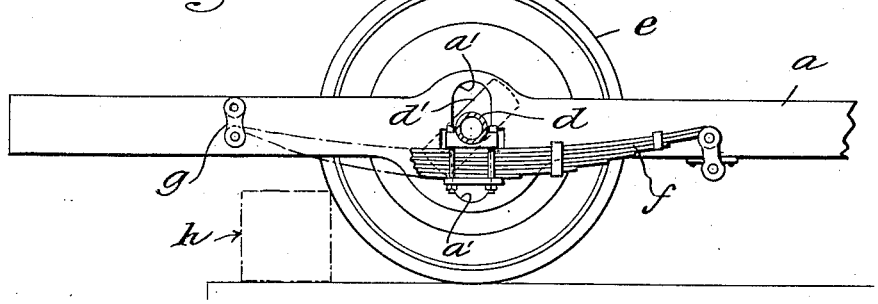
Figure 2 is a view of the chassis shown in Figure 1 taken along the plane indicated by the line 2—2 of Figure 1 and looking in the direction of arrows and showing the right-hand side frame member of the chassis.
Figure 3:
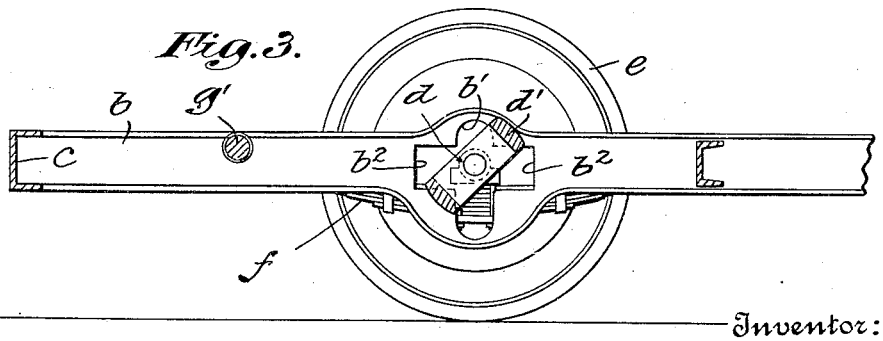
Figure 3 is a view in section through the chassis shown in Figure 1 and taken on the plane indicated by the line 3—3 and looking in the direction of the arrows and showing the left-hand side frame member.

A low hung chassis such as is described presents a problem in the spring suspension because it will be evident that if the shackles at the rear end extend below the frame desirable ground clearance is lost. Referring to Figure 2, for instance, a string piece or the like is indicated at $n$ against which it might be desirable to back the vehicle. Such an element might be nearly as high as the frame itself and for that reason commercial requirements make it important that the shackle shall not extend below the frame. In the illustrated embodiment the rear ends of the springs $f$ are secured to the respective side frame members by compression shackles $g$. These shackles may be hung on a cross tube $g'$ which may be placed at such a point that the lower end of the shackle at the points of attachment to the spring eyes are not below the side frame members of the chassis. Accordingly, when the vehicle is backed against such a piece as is represented at $n$ the springs do not interfere.

Changes in details of construction may be made without departing from the invention.

What I claim is:

1. A chassis frame having side frame members provided with aligned openings to receive an axle and permit relative bodily movements vertically between the axle and frame, one of said side frame members having an additional opening communicating with the first named opening to permit the passage therethrough of the enlarged portion of the axle.

2. A chassis frame having right and left-hand side frame members provided with openings therein to receive an axle, the left-hand side frame member having an opening of greater area than the right-hand side frame member to permit the passage therethrough of the enlarged section of the axle.

3. A chassis frame having side frame members provided with aligned vertically disposed openings therein to receive an axle and permit relative vertical movements of the axle with respect to the frame, one of said side frame members having an additional opening extending horizontally of the frame member to permit the passage therethrough of the carrier section of the axle.

This specification signed this 16th day of January, A. D. 1931.

AUGUST H. LEIPERT.